United States Patent
Johnson

(10) Patent No.: US 9,699,272 B2
(45) Date of Patent: Jul. 4, 2017

(54) MECHANISM FOR INITIATING BEHAVIOR IN A NATIVE CLIENT APPLICATION FROM A WEB CLIENT APPLICATION VIA A CUSTOM URL SCHEME

(71) Applicant: Oracle International Corporation, Redwood Shores, CA (US)

(72) Inventor: Mark A. Johnson, Denver, CO (US)

(73) Assignee: Oracle International Corporation, Redwood Shores, CA (US)

(*) Notice: Subject to any disclaimer, the term of this patent is extended or adjusted under 35 U.S.C. 154(b) by 617 days.

(21) Appl. No.: 13/842,778

(22) Filed: Mar. 15, 2013

(65) Prior Publication Data

US 2014/0095589 A1    Apr. 3, 2014

Related U.S. Application Data

(60) Provisional application No. 61/707,930, filed on Sep. 29, 2012.

(51) Int. Cl.

| | | |
|---|---|---|
| *G06F 15/16* | (2006.01) | |
| *H04L 29/06* | (2006.01) | |
| *H04L 29/08* | (2006.01) | |
| *G06F 9/54* | (2006.01) | |

(52) U.S. Cl.
CPC .............. *H04L 67/42* (2013.01); *G06F 9/547* (2013.01); *H04L 67/02* (2013.01); *H04L 67/2819* (2013.01); *G06F 2209/542* (2013.01)

(58) Field of Classification Search
CPC ... H04L 12/58; H04L 12/581; H04L 12/5815; H04L 67/42; H04L 29/06

USPC .......................................................... 709/203
See application file for complete search history.

(56) References Cited

U.S. PATENT DOCUMENTS

| | | | | |
|---|---|---|---|---|
| 5,720,036 A | * | 2/1998 | Garfinkle et al. ............ | 709/225 |
| 6,023,698 A | * | 2/2000 | Lavey et al. | |
| 6,775,687 B1 | * | 8/2004 | Binding et al. ............... | 709/203 |
| 7,831,731 B2 | * | 11/2010 | Tang ...................... | H04L 29/06 |
| | | | | 709/222 |
| 8,078,727 B2 | * | 12/2011 | Hanson et al. ............... | 709/226 |
| 8,239,445 B1 | * | 8/2012 | Gage et al. ................... | 709/203 |

(Continued)

FOREIGN PATENT DOCUMENTS

EP        2336995 A2    6/2011

*Primary Examiner* — Dhairya A Patel
(74) *Attorney, Agent, or Firm* — Trellis IP Law Group, PC

(57) ABSTRACT

A system and method for facilitating native client device application interaction with a web application. An example method includes monitoring request messages output from the web application; determining one or more of the request messages include an indication that the one or more request messages represent a request to implement an action that can be performed via one or more resources of a client device, and providing a signal in response thereto; and implementing the action in response to the signal. In a more specific embodiment, the method further includes employing a client request interceptor in communication with the web application to forward requests output by the web application and determined by the interceptor to be requests for native content or functionality to a native behavior dispatcher, which communicates with a native container application to facilitate implementing the action.

19 Claims, 5 Drawing Sheets

(56) References Cited

U.S. PATENT DOCUMENTS

| | | | |
|---|---|---|---|
| 8,839,266 B1* | 9/2014 | Partridge | G06F 13/00 719/310 |
| 2004/0226459 A1* | 11/2004 | Hill | G06F 9/547 100/116 |
| 2007/0156659 A1* | 7/2007 | Lim | 707/3 |
| 2007/0218867 A1* | 9/2007 | Mononen | G08B 21/0415 455/404.1 |
| 2010/0017494 A1* | 1/2010 | Hindawi | H04L 41/0893 709/206 |
| 2010/0169438 A1* | 7/2010 | Denner et al. | 709/206 |
| 2010/0313276 A1* | 12/2010 | Banti et al. | 726/28 |
| 2011/0246606 A1* | 10/2011 | Barbeau et al. | 709/217 |
| 2012/0150955 A1* | 6/2012 | Tseng | H04L 51/22 709/204 |
| 2012/0278395 A1* | 11/2012 | Garcia | G06Q 10/00 709/205 |
| 2013/0103757 A1* | 4/2013 | Mitchell | G06Q 50/01 709/204 |
| 2014/0072235 A1* | 3/2014 | Costantino et al. | 382/218 |
| 2014/0173692 A1* | 6/2014 | Srinivasan et al. | 726/4 |

* cited by examiner

MECHANISM FOR INITIATING BEHAVIOR IN A NATIVE CLIENT APPLICATION FROM A WEB CLIENT APPLICATION VIA A CUSTOM URL SCHEME

CROSS REFERENCES TO RELATED APPLICATIONS

This application claims priority from U.S. Provisional Patent Application Ser. No. 61/707,930, entitled A MECHANISM FOR INITIATING BEHAVIOR IN A NATIVE CLIENT APPLICATION FROM A WEB CLIENT APPLICATION VIA A CUSTOM URL SCHEME, filed on Sep. 29, 2012 which is hereby incorporated by reference as if set forth in full in this application for all purposes.

BACKGROUND

The present application relates to software and more specifically to systems and methods for facilitating using features and capabilities of a client device in applications employing both client-side and server-side functionality.

Software applications that employ both server-side and client-side functionality are employed in various demanding applications, including mobile enterprise applications that selectively access sever-side or cloud based functionality.

The rise in popularity of mobile devices and the higher expectations regarding user experience on such devices has led to resurgence in popularity of native client applications to interact with web-based, i.e., server-side, applications. This has increased the demand for applications that can use native device features, such as a camera, Global Positioning System (GPS) receiver, and so on, in combination with cloud-based services. However, such applications may be inhibited by an inherent lack of effective messaging schemes and mechanisms for enabling efficient interaction between web applications and accompanying native container applications used to access native device features.

SUMMARY

An example embodiment described herein is implemented via software running on a client device, and enables a web application to initiate behavior in a native container application in which the web application runs. The example method includes intercepting web communications initiated by a web browser control associated with the web application; analyzing a protocol scheme associated with the web communications to determine whether a request represented by an intercepted web communications is for a native action that can be performed by accompanying client device, and then selectively triggering performance of the requested action.

Hence, certain embodiments discussed herein provide a mechanism or method that enables a web application to initiate native device behavior while running in its host native application. This enables smooth process flow and user experience for the native device integrations with the web application.

A further understanding of the nature and the advantages of particular embodiments disclosed herein may be realized by reference of the remaining portions of the specification and the attached drawings.

DETAILED DESCRIPTION OF EMBODIMENTS

One of the challenges with conventional approaches for approaches to developing hybrid applications that employ both native functionality and web-based functionality (e.g., as provided by one or more web services, websites, etc.) is enabling effective communication between the hosted web application and the native container application. Certain embodiments discussed herein provide a mechanism or method that enables a web application to initiate native device behavior while running in its host native application.

Figure 1:
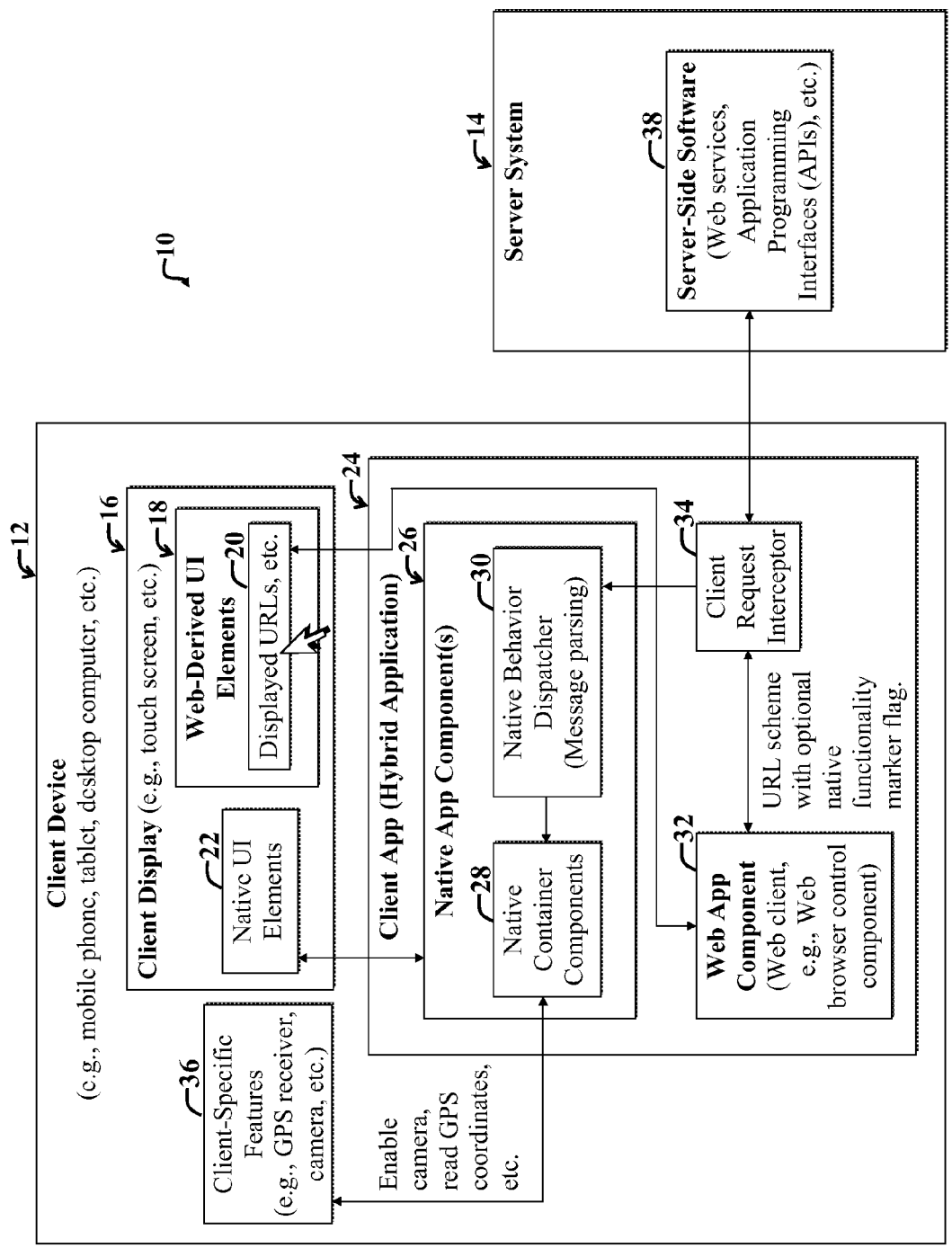
FIG. 1 is a diagram of an example system for facilitating initiating behavior in a native client application from a web client application component via a custom Uniform Resource Locator (URL) scheme.

For clarity, certain well-known components, such as hard drives, processors, operating systems, power supplies, routers, Internet Service Providers (ISPs), and so on, have been omitted from FIG. 1. However, those skilled in the art with access to the present teachings will know which components to implement and how to implement them to meet the needs of a given implementation.

FIG. 1 is a diagram of an example system 10 for facilitating initiating behavior in a native client application component 26 (also called a native application component, native component, or native client application herein) from a web client application component 32 of hybrid application 24 via a custom Uniform Resource Locator (URL) scheme for request messages output from the web client application component 32 (also simply called the web client component). The hybrid application 24 is also called a native container application that contains or hosts the web application component 32.

For the purposes of the present discussion, web client component (also called web client application or web browser component) may be any software component, such as a component of a hybrid application, that is adapted to communicate with a server and retrieve content therefrom.

A hybrid application may be any application that is adapted to communicate with a server and further includes functionality for accessing and/or using client-side resources, such as a camera, Global Positioning System (GPS) receiver, platform-specific operating system functionality, and so on.

Functionality for accessing and/or using client-side resources, also called native resources, is implemented via a so-called native client-side component or application (also called a native client device application), such as the native application component 26.

The term functionality, as used herein, may refer to hardware and/or software functionality, which may be any function, capability, or feature, that is provided via a computing resource, such as device hardware and/or computer code, i.e., software. Generally, functionality may be accessible via use of a user interface and accompanying user interface controls and features. Functionality may include actions and associated capabilities, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

An action may be any process or collection of processes or operations implemented via a computing resource, e.g., hardware and/or software. Additional examples of processes include updating or editing data in a database, retrieving GPS coordinate information from a GPS receiver, initiating a photograph via a client-side camera, triggering a refresh of a user interface display screen, calling a web service to perform another action, and so on.

Native content or functionality may be any client-device functionality, e.g., capabilities, data, and/or accompanying resources, that may be implemented or used via a client device, such as the client device 12.

The example system 10 includes the client device 12 in communication with a server 14, which hosts server-side software 38. The client device 12, which may be implemented as a smartphone, tablet, desktop computer, and so on, includes a client display (e.g., a touch screen, monitor, etc.) in communication with a client application 24.

The client application 24 represents a hybrid application that includes the native application component 26 and the web application component 32. A client request interceptor 34 is adapted to monitor output request messages from the web application component 32. The web application component 32, which may represent a web client or browser control component, is adapted to facilitate rendering and displaying web-derived UI elements 18, such as UI elements of a webpage (e.g., HTML content), such as URLs 20 on a the client display 16.

The native application component 24 includes computer code for facilitating rendering and displaying native UI elements 22 via the client display 16. The native UI elements 22 and the web-derived UI elements 18 may be simultaneously displayed as part of a UI of the hybrid application 24.

For the purposes of the present discussion, a UI element, such as a hyperlink, button, menu item, or other user interface control, may be any graphical depiction of a user interface section, portion, or feature, such as a user interface control. A user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

A native element of a user interface display screen (also called a native UI element) may be UI element, such as a UI control, whose appearance or functionality is based on one or more characteristics of the platform upon which the element is displayed. A characteristic of a platform may be any software or hardware feature, set of features, or characteristics of a client device. Generally, a native UI element may be generated or rendered via client-side software components.

The native application component 26 further includes a native behavior dispatcher 30 module in communication with one or more native container components 28. The client request interceptor 34 communicates with the client request interceptor 34 and may receive customer URLs adapted to trigger one or more native client behaviors, i.e., actions by the client device 12 using one or more client resources, client-specific features and accompanying functionality (e.g., GPS receiver, camera, etc.).

For the purposes of the present discussion, a native behavior dispatcher, such as the native behavior dispatcher 30, may be any software and/or hardware that is adapted to facilitate delivering a message to an application or component thereof (e.g., the native container component(s) 28) for implementing an action specified by the message via one or more resources of a client device. An action implemented via a client device and accompanying software and/or hardware resources is said to represent a native behavior. Hence, client-side platform-specific actions may be called native behaviors herein.

The application or component that receives output from a native dispatcher 28 may be a native container application or component. A native container application or component may be any software that is adapted to execute a set of commands to run another application, control hardware device, or use other client-side resources.

The client request interceptor 34 acts as a request message switch, forwarding URL request messages relevant to client-side functionality to the native application component 26 and passing URLs that do not request native client behaviors to the server-side software 38. Note that depending upon the implementation, return messages from the server 14 and accompanying server-side software 38 may bypass the client request interceptor 34. However, in certain implementations, the client request interceptor 34 may also be adapted to dispatch server-generated messages to the native application components 26.

In an example operative scenario, the web application component 32 responds to user selection of one of the web-derived UI elements 18 by selectively invoking client-side functionality when the selected UI element represents a request for native client-side functionality, e.g., activation of a camera or other client-specific hardware and/or software features 36.

A custom URL scheme is employed by the web application component 32 to enable marking of request messages that may be suitable for invocation of client-side behaviors and actions, as discussed more fully below.

Web application component requests from the web application component 32 are delivered are selectively delivered to the client-side application component 26 based on the details of the request.

Note that the web application component 32 is hosted within the client-side application 24 and is said to be hosted within the native hybrid client-side application 24.

Through part of the UI of the client display 16, the UI portion 18 of the web application component 32 is rendered. In another part of the UI of the client application 24 displayed on the client display 16, native UI elements 22 are rendered.

A button or link 20 in web application component portion 18 of the UI may be selected by a user. In certain instances, the selected UI element will be associated with a conventional request for server-side functionality. Conventionally, all buttons, links and other UI elements of the web application component 32 are sandboxed, such that they are limited to invoking or accessing server-side content and/or functionality.

However, in the present example embodiment, set forth above, in cases where the selected UI element represents a request that can be handled by client-side functionality, the client application 24 may call one or more applicable native container components used to invoke or otherwise use native client-side functionality.

This use of the client request interceptor 34 and accompanying URL scheme used to modify a URL with a detectable flag or client-side indicator or marker enables use of a web application component to trigger native client-side behaviors of the client device 12.

The native behavior dispatcher 30 includes computer coding for parsing received custom URLs output from the client request interceptor 34 and determining which native capability (e.g., camera, GPS receiver, data refresh, etc.) and associated action pertains to the received URL. Such information may be encoded in a portion of the URL output from the client request interceptor 34.

Those skilled in the art with access to the present teachings may readily modify URLs and associated messages to create flags or markers to implement embodiments discussed herein, without undue experimentation.

The native container components 28, while shown included in the client application 24, need not be included therein in all implementations. In general, the native container components 28 may represent any hardware and/or software components used invoke, access, or otherwise control client-side functionality and associated resources for implementing an action indicated via the URL request message output from the web application component 32 and intercepted by the client request interceptor 34.

Figure 2:
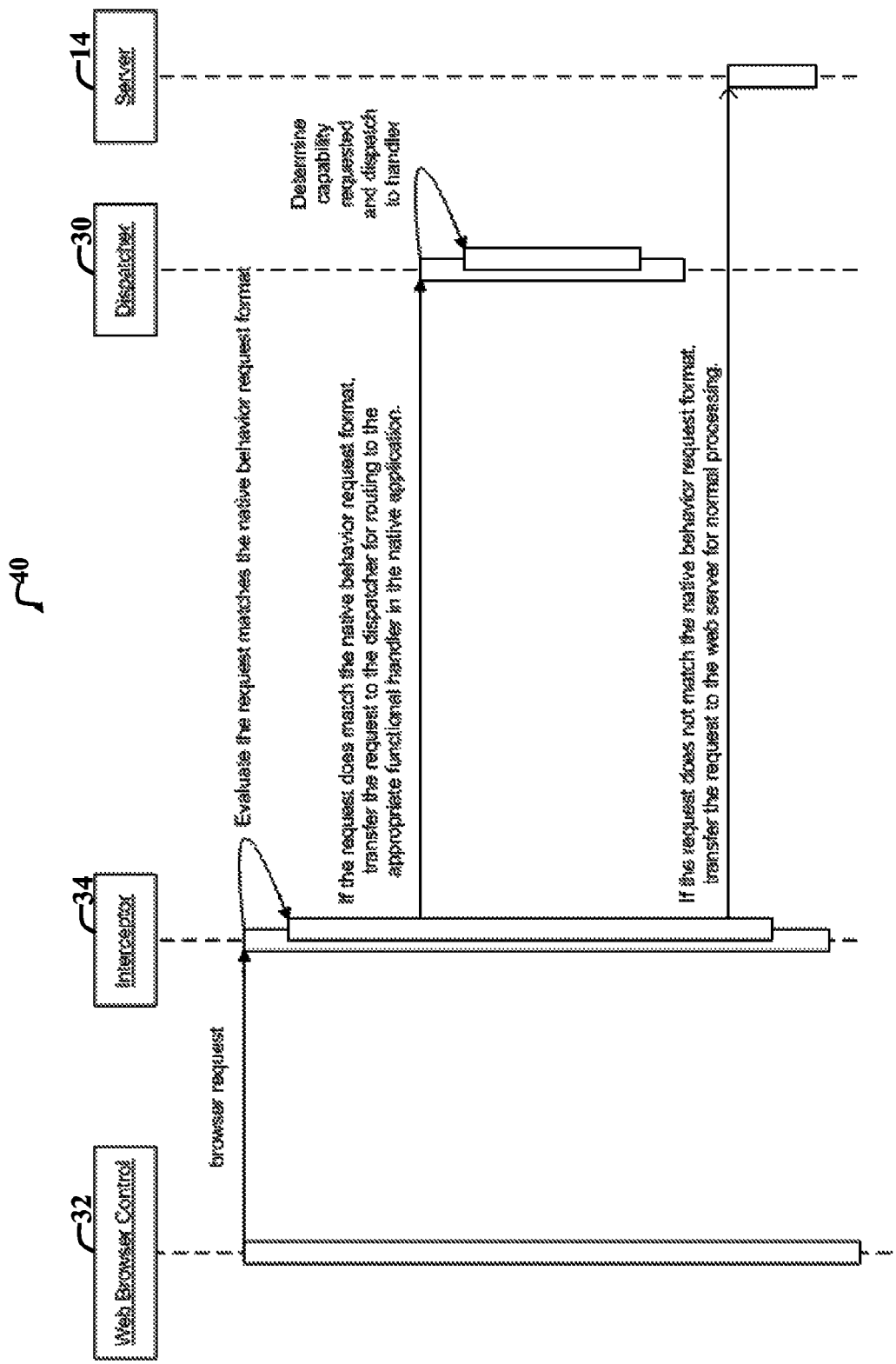
FIG. 2 is Ping Pong diagram illustrating example communications between a web client component (e.g., web browser control), native client-side software components (e.g., browser request message interceptor).

FIG. 2 is Ping Pong diagram illustrating example communications 40 between a web client component (e.g., web browser control) 32, native client-side software components (e.g., browser request message interceptor) 34, 30. With reference to FIG. 2, browser request messages output from the web browser control 32 are intercepted by the interceptor 34, which evaluates the request to determine if the request matches a native behavior request format.

If the request message matches a native behavior request format, the request is delivered to the dispatcher 30, which determines the client-device capability requested by the request message and then dispatches the message to a handler (e.g., one of the native container components 28 of FIG. 1).

If the intercepted request message does not match the native behavior request format, the request is transferred to the web server 14 for normal processing.

Figure 3:
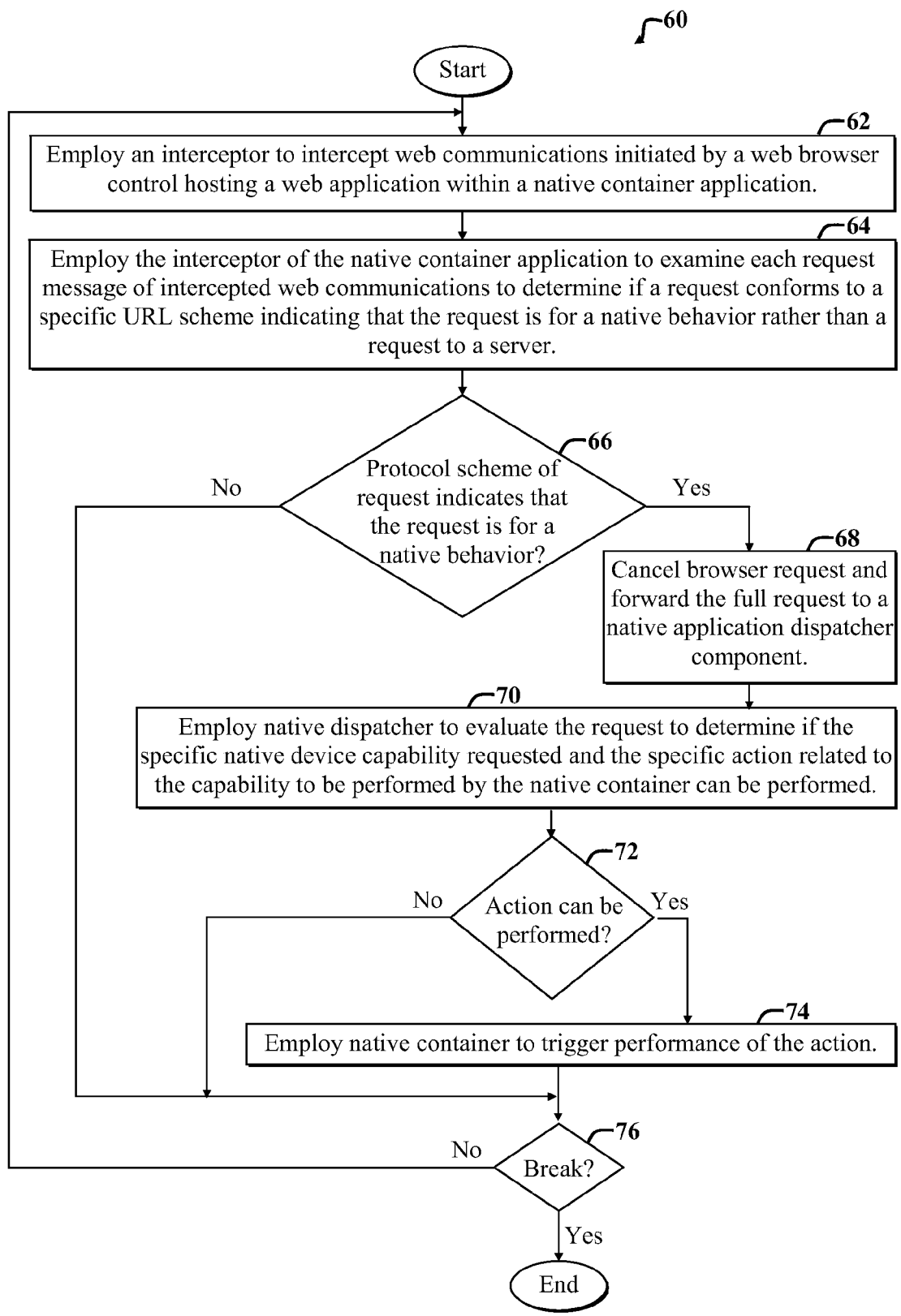
FIG. 3 is a flow diagram of a first example method adapted for use with the system of FIG. 1.

FIG. 3 is a flow diagram of a first example method 60 adapted for use with the system of FIG. 1. The method 60 (e.g., as implemented via software running on a client device) illustrates an example embodiment for selectively intercepting communications from a browser or web client to facilitate enabling a web application to initiate native device behavior while running within its host native application (e.g., a web browser control).

The example method 60 includes an initial request-interception step 62, which includes employing an interceptor to intercept web communications initiated by a web browser control hosting a web application within a native container application.

A subsequent message-examining step 64 includes employing the interceptor of the native container application to examine each request message of intercepted web communications to determine if a request conforms to a specific URL scheme indicating that the request is for a native behavior rather than a request to a server.

A subsequent protocol-checking step 66 passes control to a canceling step 68 if the protocol or other characteristic of the request message indicates that the request message is for a native client behavior or otherwise passing control to a break-checking step 76. The break-checking step 76 includes determining if a break is detected (e.g., application exit signal), and if so, the method 60 completes; otherwise control is passed back to the request-interception step 62.

The canceling step 68 includes canceling or redirecting the browser request and forwarding the full request to a native application dispatcher component.

In a subsequent evaluation step 70, the native dispatcher further evaluates the request message to determine if the specific native device capability requested and the specific action related to the capability to be performed by the native container can be performed.

A subsequent action-checking step 72 passes control to an action step 74 if the action can be performed. Otherwise control is passed to the break-checking step 76. The action step 74 includes employing a native container to trigger performance of the action.

In summary, software constructed in accordance with the present embodiment enables communication between a web application hosted in a native container application (i.e., a web application container) and the native container by intercepting all web communications initiated by the web browser control hosting the web application, i.e., web client, (which are both in turn hosted by the native container application). Within an interceptor, the native container examines each request to see if it conforms to a specific Uniform Resource Locator (URL) scheme indicating that the request is for a native behavior rather than a request to a server.

If the protocol scheme of the request indicates that the request is for native behavior, the browser request is cancelled and the full request URL is forwarded to a native action dispatcher component. The native dispatcher component further evaluates the request to determine the specific native device capability (i.e., camera, GPS, etc. . . . ) requested and the specific action related to the capability to be performed by the native container can be performed. The native container then performs the requested action. Contextual information relevant to the action to be performed can be passed as part of the request via traditional URL parameters For the purposes of the present discussion, a web application container may be a native application that is adapted to process function calls and/or other communications from a web application such as a web client, i.e., browser component.

An example custom URL Scheme specification is as follows:
<scheme>://<capability>/<action>?<context-params>
scheme—instructs the container to interpret the request as a native operation.
capability—specifies which type of native behavior the call is requesting (i.e. camera, accelerometer, etc. . . . )
action—specifies what should be done by/to the capability (i.e. enable, open camera, etc. . . . )
context-params—specifies any contextual information relevant to the action (key=value pairs separated by '&')

An example custom URL is as follows:
native://camera/
enable?param1=true&m2=false&m3='test'&m4=1234

Hence, this embodiment enables a web application to initiate behavior in a native container application hosting the web application, which facilitates efficient process flow and user experience for the native device integrations with web applications.

Figure 4:
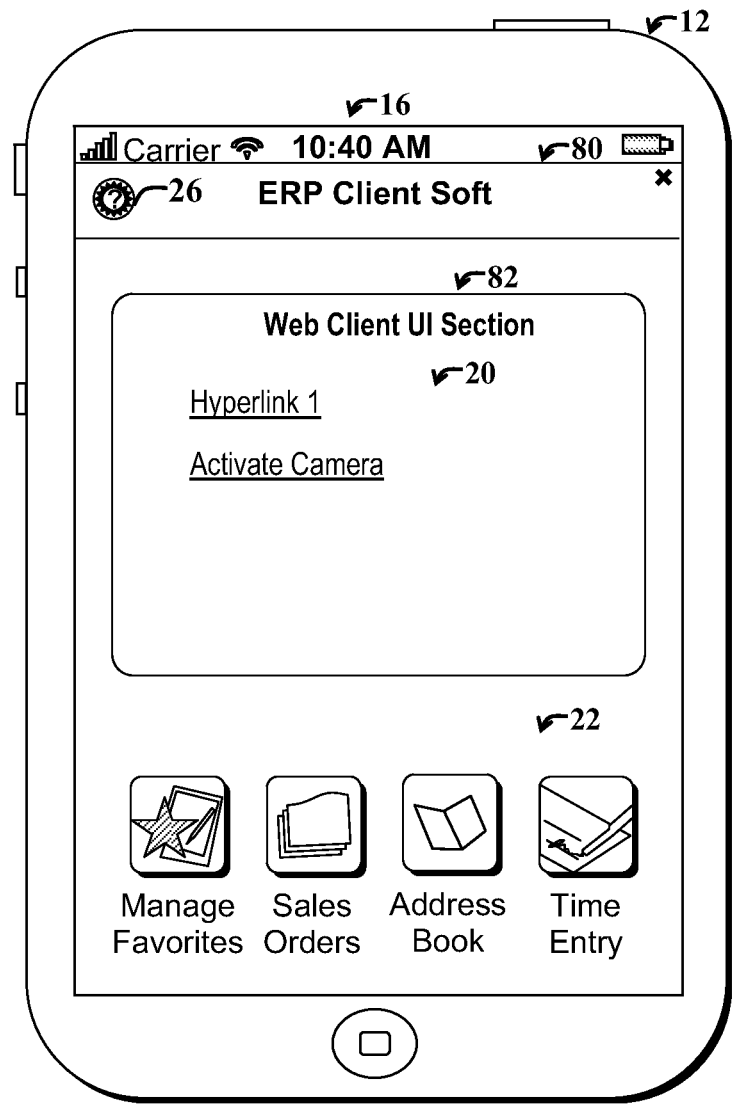
FIG. 4 is a diagram illustrating an example user interface display screen showing both web-client generated UI elements and native client-side elements 22 implemented via an underlying hybrid application that employs both client-side and server-side functionality.

FIG. 4 is a diagram illustrating an example user interface display screen 80 presented on a client display 16 (e.g., a touch screen display showing both web-client generated UI elements 20 in a web client UI section 82 and native client-side elements 22 implemented via an underlying hybrid application that employs both client-side an server-side functionality.

The example URLs 20 include a hyperlink that is adapted to activate a client-side camera. User selection of the "activate camera" link may trigger generation of a custom URL that is intercepted, and the associated request encoded in the URL is handled locally on the client 12.

Figure 5:
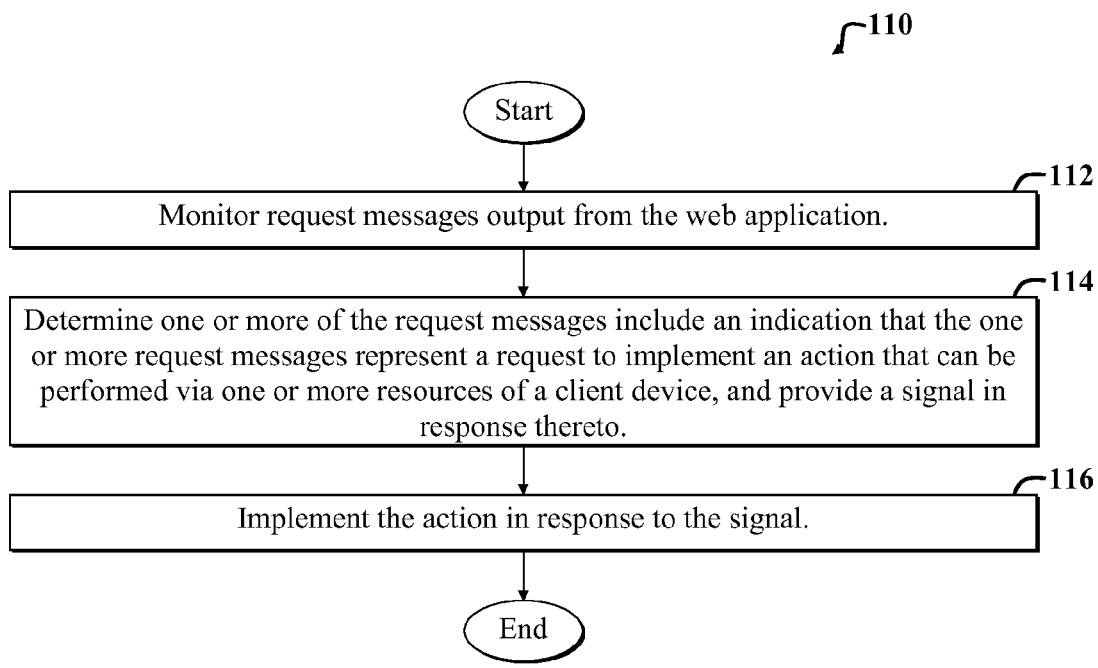
FIG. 5 is a flow diagram of a second example method adapted for use with the embodiments of FIGS. 1-3.

FIG. 5 is a flow diagram of a second more generalized example method 110 adapted for use with the embodiments of FIGS. 1-3. The method 110 is adapted to facilitate native client device application interaction with a web application. The method 110 includes a first step 112, which involves monitoring request messages output from the web application.

A second step 114 includes determining one or more of the request messages include an indication that the one or more request messages represent a request to implement an action that can be performed via one or more resources of a client device, and providing a signal in response thereto.

A third step 116 includes implementing the action in response to the signal.

Note that the method 110 may be augmented or otherwise adjusted without departing from the scope of the present teachings. For example, the second step 1114 may further include employing a client request interceptor in communication with the web application, where the client request interceptor is adapted to forward requests determined thereby to be requests for native content or functionality.

The method 110 may further include employing a marker in a Uniform Resource Locator (URL) of the one or more request messages to determine if a request is for native content or functionality.

The third step 116 may further include sending a request for native content or functionality to a native behavior dispatcher, and then employing the native behavior dispatcher to deliver instructions to a native container application or component thereof to implement an action associated with the native component or functionality. The action may include, for example, using a Global Positioning System (GPS) receiver of the client device.

Another similar method includes employing a web application to initiate behavior in a native container application in which the web application runs by intercepting web communications initiated by a web browser control associated with the web application; analyzing a protocol scheme associated with the web communications to determine whether a request represented by an intercepted web communication is for a native action that can be performed by accompanying client device; and selectively triggering performance of the requested action in response to the step of analyzing.

As set forth above, the scheme may be characterized by the following specification:

<scheme>://<capability>/<action>?<context-params> where <scheme> contains instructions for a container application that hosts the web application to interpret an intercepted request as a native operation; <capability> specifies which type of native behavior a function call associated with the request is requesting; <action> specifies what is to be performed by a capability specified by <capability>; and <context-params> specifies any contextual information pertaining to the action.

Although the description has been described with respect to particular embodiments thereof, these particular embodiments are merely illustrative, and not restrictive. For example, while certain embodiments discussed herein generally employ a web application hosted in a native container application and is adapted to facilitate intercommunications therebetween, embodiments are not limited thereto. For example, applications that employ a hybrid of client-side resources, e.g., hardware and/or software functionality that do not host web browsers in a native container application may still use embodiments discussed herein to direct relevant messages output from a web client to client-side software components to facilitate platform-specific processing and actions, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method comprising:

monitoring, by one or more processors, one or more request messages from a web application component;

determining, by the one or more processors, from one or more indicators in one or more of the request messages that those one or more request messages are for one or more actions that can be performed, at least in part, by one or more resources of a client device, wherein the determining further comprises determining that one or more request messages represent a request to access native client content or functionality:

in response to the determining, implementing, the one or more actions by using one or more resources of the client device without transmitting the one or more requests to a server;

employing, by the one or more processors, a second web application component to initiate behavior in a native container application in which the second web application component runs by performing operations comprising:

intercepting web communications initiated by a web browser control associated with the second web application component;

analyzing a protocol scheme associated with the web communications to determine whether a request represented by an intercepted web communication is for a native action that can be performed by the client device; and selectively triggering performance of the one or more actions in response to the step of analyzing, wherein the scheme is characterized by:

<scheme>://<capability>/<action>?<context-params> where <scheme> contains instructions for a container application that hosts the second web application component to interpret an intercepted request as a native operation; <capability> specifies which type of native behavior a function call associated with the request is requesting; <action> specifies what is to performed by a capability by <capability>; and <context-params> specifies any contextual information pertaining to the action.

2. The method of claim 1, wherein determining further comprises employing a client request interceptor in communication with the web application component.

3. The method of claim 1, wherein determining further comprises employing a client request interceptor in communication with the web application component, and wherein the client request interceptor is adapted to forward requests for native content or functionality.

4. The method of claim 1, wherein the one or more indicators are encoded in a uniform resource locator (URL) of the one or more request messages to determine if a request is for native content or functionality.

5. The method of claim 1, wherein the step of implementing comprises sending a request for native content or functionality to a native behavior dispatcher.

6. The method of claim 1, further comprising using a native behavior dispatcher to deliver instructions to a native container application to implement an action associated with a native component or functionality.

7. The method of claim 1, wherein at least one of the actions includes using a global positioning system (GPS) receiver of the client device.

8. The method of claim 1, further comprising modifying an existing uniform resource locator (URL) of the one or more request messages by encoding the existing URL with the one or more indicators.

9. The method of claim 1, further comprising generating one or more request messages output from the web application component in response to user selection of a user interface (UI) element presented on a user interface display screen of the client device.

10. The method of claim 1, further comprising generating one or more request messages output from the web application component in response to user selection of a user interface (UI), wherein the UI includes a UI element derived from content retrieved from the server by the web application component.

11. The method of claim 1, further comprising displaying one or more native UI elements in a user interface display screen in addition to a UI element derived from content retrieved from the server by the web application component.

12. The method of claim 1, further comprising forwarding one or more request messages that are not determined to represent a request to access native client content or functionality to the server in communication with the client device.

13. The method of claim 1, further comprising employing a hybrid application that includes both native client-side functionality and server-side functionality to implement the steps of monitoring, determining, and implementing and wherein the hybrid application resides on the client device.

14. The method of claim 1, wherein one or more of the request messages include a uniform resource locator (URL) that includes a portion that is adapted to indicate whether the one or more request messages suitable for handling by a native client-side application.

15. The method of claim 1, further comprising employing a uniform resource locator (URL) scheme to implement a request message switching function to selectively dispatch one or more URLs to client-side software to facilitate implementing one or more actions indicated in one or more dispatched URLs.

16. The method of claim 1, further comprising employing a uniform resource locator (URL) scheme to implement a request message switching function to selectively dispatch one or more URLs to client-side software to facilitate implementing one or more actions indicated in one or more dispatched URLs, wherein the client-side software includes a native dispatcher in communication with one or more native container application, and wherein the method further includes using the one or more native container applications to invoke a client-side resource to implement the one or more actions.

17. The method of claim 1, further comprising analyzing a protocol scheme associated with web communications to determine whether at least one request message represented by an intercepted web communication is for one or more actions that can be performed by the client device, wherein the scheme includes:

an instruction for a container application that hosts the web application component to interpret an intercepted request as a native operation;

a capability specification to indicate which type of native behavior a function call associated with the request is requesting;

an action specification to indicate what is to be performed; and contextual information pertaining to the action.

18. An apparatus comprising:

a digital processor coupled to a display and to a processor-readable storage device, wherein the processor-readable storage device includes one or more instructions executable by the digital processor to perform operations comprising:

monitoring one or more request messages from a web application component;

determining from one or more indicators in one or more of the request messages that those one or more request messages are for one or more actions that can be performed, at least in part, by one or more resources of a client device, wherein the determining further comprises determining that the one or more request messages represent a request to access native client content or functionality;

in response to the determining, implementing the one or more actions by using the one or more resources of the client device without transmitting the one or more requests to a server;

employing a second web application component to initiate behavior in a native container application in which the second web application component runs by performing operations comprising:

intercepting web communications initiated by a web browser control associated with the second web application component;

analyzing a protocol scheme associated with the web communications to determine whether a request represented by an intercepted web communication is for a native action that can be performed by the client device; and selectively triggering performance of the one or more actions in response to the step of analyzing, wherein the scheme is characterized by:

<scheme>://<capability>/<action>?<context-params> where <scheme> contains instructions for a container application that hosts the second web application component to interpret an intercepted request as a native operation; <capability> specifies which type of native behavior a function call associated with the request is requesting; <action> specifies what is to be performed by a capability specified by <capability>; and <context-params> specifies any contextual information pertaining to the action.

19. A processor-readable storage device including a memory, and instructions executable by a digital processor, the processor-readable storage device including one or more instructions for:

monitoring, one or more request messages from a web application component;

determining, from one or more indicators in one or more of the request messages that those one or more request messages are for one or more actions that can be performed, at least in part, by one or more resources of a client device, wherein the determining further comprises determining that one or more request messages represent a request to access native client content or functionality:

in response to the determining, implementing, the one or more actions by using one or more resources of the client device without transmitting the one or more requests to a server;

employing, a second web application component to initiate behavior in a native container application in which the second web application component runs by performing operations comprising:

intercepting web communications initiated by a web browser control associated with the second web application component;

analyzing a protocol scheme associated with the web communications to determine whether a request represented by an intercepted web communication is for a native action that can be performed by the client device; and selectively triggering performance of the one or more actions in response to the step of analyzing, wherein the scheme is characterized by:

<scheme>://<capability>/<action>?<context-params> where <scheme> contains instructions for a container application that hosts the second web application component to interpret an intercepted request as a native operation; <capability> specifies which type of native behavior a function call associated with the request is requesting; <action> specifies what is to be performed by a capability by <capability>; and <context-params> specifies any contextual information pertaining to the action.

* * * * *